United States Patent
Fike et al.

(10) Patent No.: US 12,019,253 B2
(45) Date of Patent: Jun. 25, 2024

(54) OSCILLATING STACKED DIGITAL DISPLAYS FOR HOLOGRAPHIC IMAGE

(71) Applicant: UNIVERSAL CITY STUDIOS LLC, Universal City, CA (US)

(72) Inventors: Dustin Fike, Orlando, FL (US); Daniel Freedman, Orlando, FL (US); David Gerard Majdali, Orlando, FL (US)

(73) Assignee: UNIVERSAL CITY STUDIOS LLC, Universal City, CA (US)

( * ) Notice: Subject to any disclaimer, the term of this patent is extended or adjusted under 35 U.S.C. 154(b) by 0 days.

(21) Appl. No.: 17/957,601

(22) Filed: Sep. 30, 2022

(65) Prior Publication Data
US 2024/0111174 A1    Apr. 4, 2024

(51) Int. Cl.
| | |
|---|---|
| *G09G 5/00* | (2006.01) |
| *G02B 30/52* | (2020.01) |
| *G02B 30/54* | (2020.01) |
| *G09G 3/00* | (2006.01) |
| *H01F 7/06* | (2006.01) |

(52) U.S. Cl.
CPC .............. *G02B 30/52* (2020.01); *G02B 30/54* (2020.01); *G09G 3/003* (2013.01); *H01F 7/06* (2013.01); *G09G 2300/023* (2013.01)

(58) Field of Classification Search
CPC ..................................................... G06F 3/016
See application file for complete search history.

(56) References Cited

U.S. PATENT DOCUMENTS

| | | | |
|---|---|---|---|
| 5,907,312 A * | 5/1999 | Sato ...................... | G02B 30/54 359/558 |
| 5,954,414 A | 9/1999 | Tsao | |
| 6,778,295 B1 | 8/2004 | Babulski | |
| 8,817,068 B2 | 8/2014 | Yoon et al. | |
| 2002/0130820 A1* | 9/2002 | Sullivan ............... | H04N 13/395 348/E13.058 |
| 2003/0067423 A1 | 4/2003 | Suyama et al. | |
| 2005/0259302 A9 | 11/2005 | Metz et al. | |
| 2006/0273983 A1 | 12/2006 | Koo et al. | |
| 2008/0285100 A1 | 11/2008 | Evans et al. | |
| 2010/0073376 A1 | 3/2010 | Schmale | |

(Continued)

OTHER PUBLICATIONS

International Search Report and Written Opinion, PCT/2023/075504, Jan. 26, 2024, 9 pgs.

*Primary Examiner* — Nan-Ying Yang
(74) *Attorney, Agent, or Firm* — LOZA & LOZA, LLP; Lew Edward V. MacApagal (57) ABSTRACT

Aspects of the disclosure relate to methods, apparatus, and systems for oscillating transparent digital displays to generate a three-dimensional (3D) holographic image. A holographic imaging system includes a plurality of digital screens, wherein each screen of the plurality of digital screens is positioned parallel to an x-axis and a y-axis, and the screens are stacked along a z-axis perpendicular to the x-axis and the y-axis, a propulsion system configured to oscillate the plurality of digital screens along the z-axis, and a control system. The control system is configured to generate a digital image, display different slices of the digital image on the plurality of digital screens, and activate the propulsion system to oscillate the plurality of digital screens in synchronization with the display of the different slices on the screens to generate a three-dimensional (3D) image.

18 Claims, 8 Drawing Sheets

(56) References Cited

U.S. PATENT DOCUMENTS

| | | | |
|---|---|---|---|
| 2010/0328328 A1* | 12/2010 | Choi | B82Y 30/00 |
| | | | 345/82 |
| 2013/0120816 A1 | 5/2013 | Yoon et al. | |
| 2017/0261746 A1* | 9/2017 | Tam | H04N 13/332 |
| 2018/0181066 A1* | 6/2018 | Holstine | G03H 1/268 |
| 2019/0317261 A1 | 10/2019 | Dimov et al. | |

* cited by examiner

OSCILLATING STACKED DIGITAL DISPLAYS FOR HOLOGRAPHIC IMAGE

TECHNICAL FIELD

The technology discussed below relates generally to holographic imaging systems, and more particularly, to oscillating stacked digital displays to generate a three-dimensional (3D) holographic image.

INTRODUCTION

Technologies for making and reproducing three-dimensional (3D) images and videos are actively being developed. In a conventional two-dimensional (2D) imaging system, image data is projected onto a screen in a planar manner, thus providing a viewer with only a plan view of the image. However, in a 3D imaging system, the image data is presented to the viewer with more depth such that the viewer is provided with a comprehensive and life-like view of the image.

A previous 3D imaging technology utilizes a single screen displaying an image that is oscillated at a particular frequency in the direction of a viewer's field of view. As the screen is rapidly moved back and forth with certain distances, the viewer can see the tight emanating from the screen at different depths and a dynamic 3D image appears to the viewer's eyes due to the viewer's persistence of vision. Accordingly, the 3D image is generated when the screen is moved up and down, or in and out, depending on the screen's orientation with respect to the viewer.

Notably, the previous 3D imaging technology utilizes one or more pistons coupled to an outer edge or back surface of the screen to drive the screen's oscillation at the particular frequency. However, because the previous technology uses pistons to oscillate a single screen, it is limited with respect to generating 3D images having a great amount of depth. For example, the image depth may be limited by a length of the one or more pistons since a maximum distance that the single screen can move is dependent on a maximum piston length.

Moreover, the previous 3D imaging technology utilizes a traditional opaque digital screen. This allows the previous technology to generate traditional light-colored 3D holograms, but does not allow the opportunity to create dark-colored 3D holograms (e.g., smoke shapes).

Accordingly, the present disclosure is directed to a 3D holographic imaging system including a plurality of stacked digital screens that are oscillated to generate a 3D image. By utilizing multiple stacked digital screens, a scale and depth of the 3D image is extended beyond a maximum possible scale and depth using a single digital screen. Moreover, the 3D holographic imaging system of the present disclosure utilizes transparent digital screens to facilitate the generation of light-colored holograms, dark-colored holograms, and holograms having colors therebetween.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure relate to methods, apparatus, and systems for oscillating stacked digital display screens to generate a three-dimensional (3D) holographic image. A holographic imaging system includes a plurality of digital screens (e.g., transparent digital screens), wherein each screen of the plurality of digital screens is positioned parallel to an x-axis and a y-axis, and the screens are stacked along a z-axis perpendicular to the x-axis and the y-axis, a propulsion system configured to oscillate the plurality of digital screens along the z-axis, and a control system. The control system is configured to generate a digital image, instruct one or more digital screens of the plurality of digital screens to display different slices of the digital image, and send a signal to activate the propulsion system to oscillate the plurality of digital screens in synchronization with the display of the different slices on the one or more digital screens to generate a three-dimensional (3D) image. Other aspects, embodiments, and features are also claimed and described.

In an aspect, a method for generating a holographic image is disclosed. The method includes generating a digital image via a control system, instructing, via the control system, one or more digital screens of a plurality of digital screens to display different slices of the digital image, wherein each screen of the plurality of digital screens is positioned parallel to an x-axis and a y-axis, and the plurality of digital screens is stacked along a z-axis perpendicular to the x-axis and the y-axis, and activating, via the control system, a propulsion system to oscillate the plurality of digital screens along the z-axis in synchronization with the display of the different slices on the one or more digital screens to generate a three-dimensional (3D) image.

In an aspect, a control system for generating a holographic image is disclosed. The control system includes a memory and at least one processor coupled to the memory. The at least one processor is configured to generate a digital image, instruct one or more digital screens of a plurality of digital screens to display different slices of the digital image, wherein each screen of the plurality of digital screens is positioned parallel to an x-axis and a y-axis, and the plurality of digital screens are stacked along a z-axis perpendicular to the x-axis and the y-axis, and activate a propulsion system to oscillate the plurality of digital screens along the z-axis in synchronization with the display of the different slices on the one or more digital screens to generate a three-dimensional (3D) inn age.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. While aspects and embodiments are described in this application by illustration to some examples, those skilled in the art will understand that additional implementations and use cases may come about fah many different arrangements and scenarios. Innovations described herein may be implemented across many differing platform types, devices, systems, shapes, sizes, and/or packaging arrangements.

Figure 1:
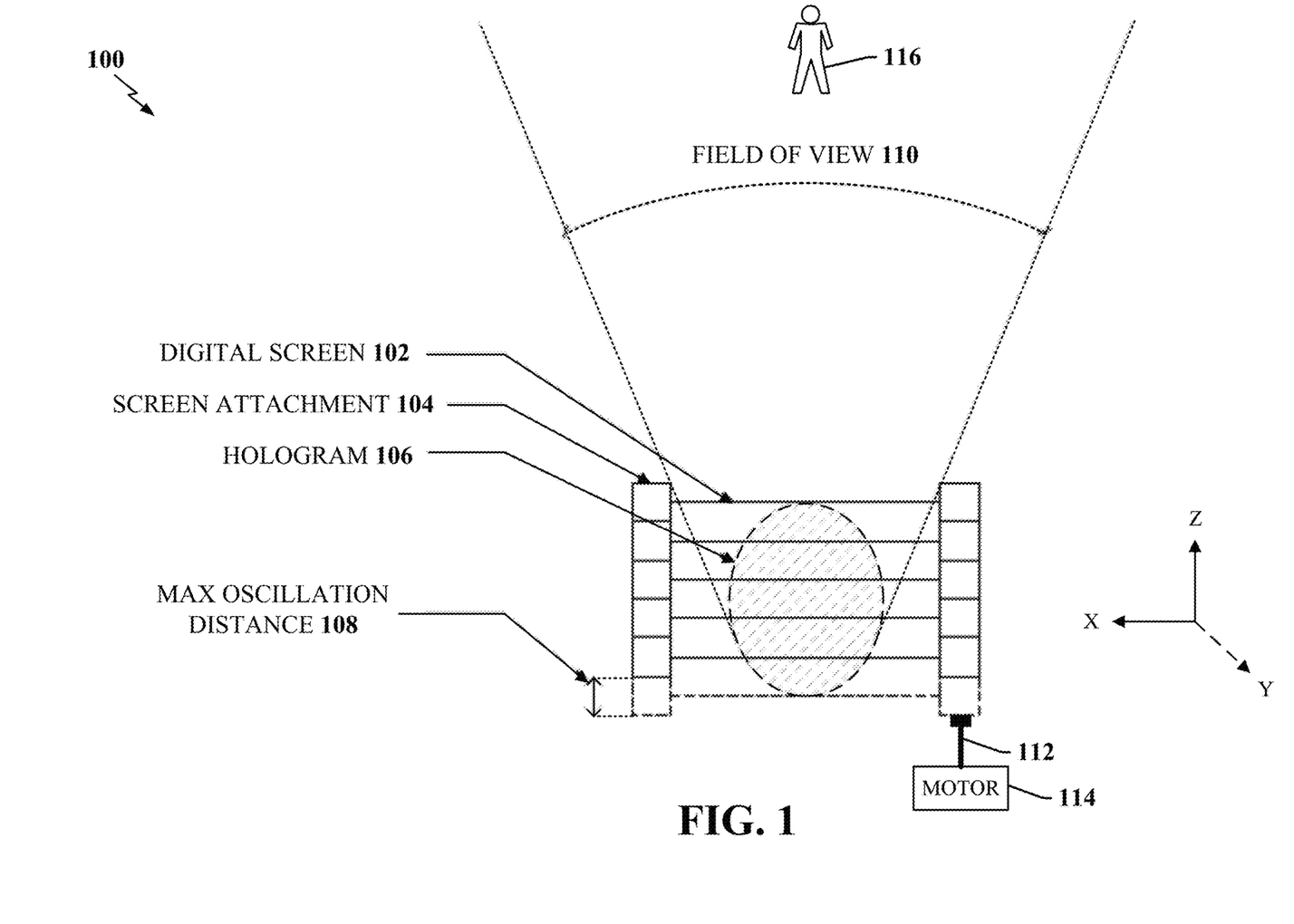
FIG. 1 illustrates an example holographic imaging system according to an aspect of the present disclosure.

FIG. 1 illustrates an example holographic imaging system 100 according to an aspect of the present disclosure. The imaging system 100 includes a plurality of digital screens 102. (e.g., flat digital screens). As shown, a total of six digital screens 102 are included in the imaging system 100, however, it is contemplated that any number forming a plurality of digital screens may be utilized. The digital screens 102 may be any type of screen or display capable of displaying a digital image, such as a liquid crystal display (LCD), a light emitting diode (LED) display, and/or an organic light emitting diode (OLED) display, Other types of digital screens implementing other types of technologies may also be utilized. In an aspect, the digital screens 102 may be transparent digital screens (e.g., to facilitate the generation of light-colored holograms, dark-colored holograms, and holograms having colors therebetween).

One or more screen attachments 104 are coupled to outer edges of a digital screen 102. A digital screen is positioned within the imaging system 100 with respect to an adjacent (or neighboring) digital screen via a screen attachment 104. The screen attachment coupled to a digital screen may connect to a frame or structure of the imaging system 100 and/or connect to a screen attachment of another digital screen. In an aspect, each digital screen 102 is positioned parallel to an x-axis and a y-axis of the imaging system 100. Moreover, the digital screens 102 are stacked along a z-axis perpendicular to the x-axis and the y-axis. In an aspect, the z-axis may be parallel to a plane on which a viewer 116 is standing (horizontal plane view). Alternatively, the z-axis may be perpendicular to the plane on which the viewer 116 is standing (e.g., tabletop view).

The imaging system 100 also includes a propulsion system configured to oscillate (e.g., move back and forth) the plurality of digital screens 102 along the z-axis. The propulsion system may include one or more pistons 112 coupled to an outer edge of the plurality of digital screens (e.g., via a screen attachment 104). The propulsion system may further include a motor 114 configured to actuate the one or more pistons 112 to oscillate the plurality of digital screens 102 along the z-axis based on an activation signal from a control system. In an aspect, the propulsion system may oscillate the digital screens 102 at various frequencies (e.g., based on how the digital image is to be displayed to a viewer).

The imaging system 100 further includes a control system (e.g., control system 614 of FIG. 6) for managing operation of the imaging system 100. The control system is configured to generate a digital image and instruct one or more digital screens of the plurality of digital screens 102 to display different slices of the digital image. The control system may generate an image, digitally divide the image into different portions (slices), and display each portion on a corresponding screen. For example, if a total of six digital screens are available for image display (as shown in FIG. 1), then the control system may divide the generated image into a maximum of six portions and instruct the six digital screens to display the respective six portions. However, as mentioned above, it is contemplated that any number of digital screens may be utilized. Therefore, the control system may divide the generated image into any number of portions up to a maximum number of digital screens included in the imaging system 100 and instruct the display screens to display the corresponding portions on the. In an aspect, the control system may divide the generated image into a number of portions that is less than the maximum number of screens. Accordingly, the control system may utilize fewer than the maximum number of screens to display the image portions.

The control system is further configured to send a signal (e.g., to the motor 114) to activate the propulsion system to oscillate the plurality of digital screens 102 in synchronization with the display of the different slices on the one or more digital screens to generate a three-dimensional (3D) image, such as a hologram 106. For example, the plurality of digital screens 102 are oscillated at a particular frequency in the direction (e.g., along the z-axis) of a viewer's (viewer 116) field of view 110. As the screens 102 are rapidly moved back and forth within a maximum oscillation distance 108 while displaying the image portions (slices), the viewer 116 can see the light emanating from the screens 102 at different depths and a dynamic 3D image (moving hologram) appears to the viewer's eyes due to the viewer's persistence of vision.

In an aspect, the control system is configured to coordinate between the screens to create a dynamic hologram. That is, the control system may correctly sequence what is displayed on each of the screens such that the image portions/slices displayed on the respective screens synchronize with each other to form the dynamic hologram (moving hologram), As the overall image moves, the control system may change the image portion shown on a particular screen to contour the image.

In an aspect, the plurality of digital screens 102 are separated from each other by a fixed distance. As such, a maximum distance the plurality of digital screens are oscillated (maximum oscillation distance 108) is equal to the fixed distance.

In an aspect, each screen in the plurality of stacked digital screens 102 may be brighter (e.g., by a certain percentage) than a screen directly before it in sequence. This is to maintain a same brightness for all screens. For example, starting from the screen closest to the viewer 116 in FIG. 1, a first screen in the stack may have 99% transparency, and therefore absorbs 1% of light. Accordingly, each successive screen in the stack may be configured to be 1% brighter than a previous screen in order for all screens in the stack to have the same brightness.

In an aspect, the imaging system 100 may be placed in the center of a gyro allowing the system 100 to be spun in any direction. As such, the oscillating digital screens 102 may rotate on any axis facilitating the generated 3D image to be looked upon from different points of view (e.g., a side profile), Moreover, the gyro increases the imaging system's mobility for various applications (e.g., to follow a theme park guest traveling in a ride vehicle).

Notably, by oscillating multiple digital screens displaying different slices of an image according to an aspect of the present disclosure, a 3D image having a greater amount of depth can be generated as compared to a previous 3D imaging technology. Moreover, the image depth is not limited by a length of an actuator or piston oscillating the screens since a distance traveled by the moving screens is not dependent on a maximum actuator/piston length as in the previous 3D imaging technology. In the present disclosure, the generation of a 3D image having any desired scale and depth may be realized by utilizing as many digital screens as needed to achieve the desired scale and depth.

Figure 2:
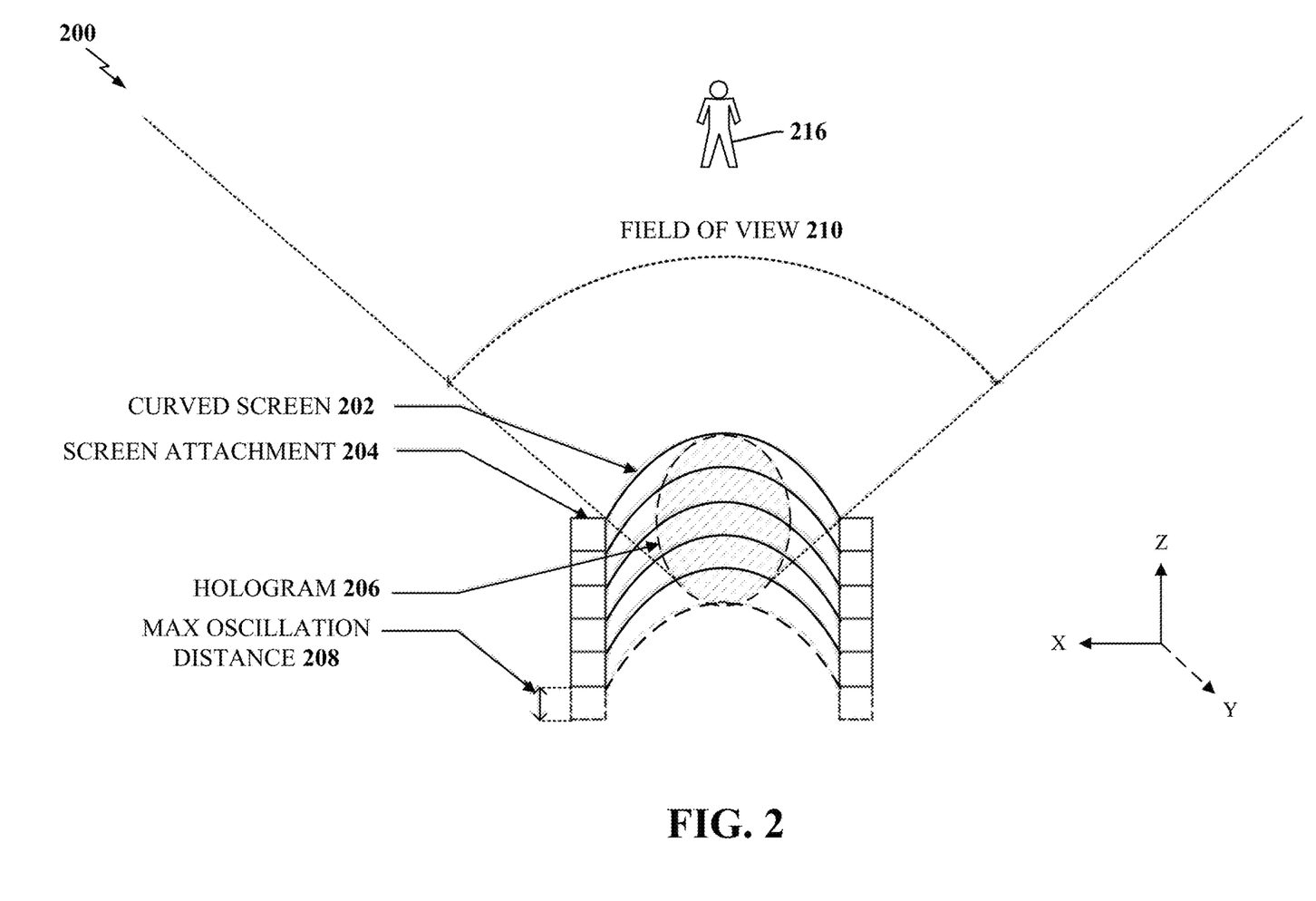
FIG. 2 illustrates an example holographic imaging system utilizing curved digital screens according to another aspect of the present disclosure.

FIG. 2 illustrates an example holographic imaging system 200 utilizing curved digital screens according to an aspect of the present disclosure. It is noted that the imaging system 200 is structured and operates in a manner similar to the imaging system 100 except for the implementation of curved digital screens. The imaging system 200 includes a plurality of curved digital screens 202. As shown, a total of six curved screens 202 are included in the imaging system 200, however, it is contemplated that any number forming a plurality of curved screens may be utilized. The curved screens 202 may be any type of screen or display capable of displaying a digital image, such as a liquid crystal display (LCD), a light emitting diode (LED) display, and/or an organic light emitting diode (OLED) display. Other types of curved screens implementing other types of technologies may also be utilized. In an aspect, the curved screens 202 may be transparent digital screens.

One or more screen attachments 204 are coupled to outer edges of a curved screen 202. A curved screen is positioned within the imaging system 200 with respect to an adjacent (or neighboring) curved screen via, a screen attachment 204. The screen attachment coupled to a curved screen may connect to a frame or structure of the imaging system 200 and/or connect to a screen attachment of another curved screen. In an aspect, edges of each curved screen 202 are positioned parallel to an x-axis and a y-axis of the imaging system 200. Moreover, the curved screens 202 are stacked along a z-axis perpendicular to the x-axis and the y-axis. In an aspect, the z-axis may be parallel to a plane on which a viewer 216 is standing (horizontal plane view). Alternatively, the z-axis may be perpendicular to the plane on which the viewer 216 is standing (e.g., tabletop view).

The imaging system 200 also includes a propulsion system configured to oscillate (e.g., move back and forth) the plurality of curved screens 202 along the z-axis. The propulsion system included in the imaging system 200 may be similar to the propulsion system (including the one or more pistons 112 and the motor 114) described with respect to FIG. 1. Therefore, discussion of the propulsion system with respect to the imaging system 200 of FIG. 2 will be omitted for brevity.

The imaging system 200 further includes a control system (e.g., control system 614 of FIG. 6) for managing operation of the imaging system 200. The control system is configured to generate a digital image and instruct one or more curved screens of the plurality of curved digital screens 202 to display different slices of the digital image. The control system may generate an image, digitally divide the image into different portions (slices), and cause the display of each portion on a corresponding curved screen. For example, the control system may divide the generated image into any number of portions up to a maximum number of curved screens included in the imaging system 200 and cause the display of the portions on corresponding curved screens. In an aspect, the control system may divide the generated image into a number of portions that is less than the maximum number of curved screens. Accordingly, the control system may utilize fewer than the maximum number of curved screens to display the image portions.

The control system is further configured to send a signal to activate the propulsion system to oscillate the plurality of curved screens 202 in synchronization with the display of the different slices on the one or more curved screens to generate a three-dimensional (3D) image, such as a hologram 206. For example, the plurality of curved screens 202 are oscillated at a particular frequency in the direction (e.g., along the z-axis) of a viewer's (viewer 216) field of view 210. As the curved screens 202 are rapidly moved back and forth within a maximum oscillation distance 208 while displaying the image portions (slices), the viewer 216 can see the light emanating from the curved screens 202 at different depths and a dynamic 3D image (moving hologram) appears to the viewer's eyes due to the viewer's persistence of vision.

Notably, because curved screens 202 are used in the imaging system 200 of FIG. 2 as opposed to the flat screens 102 used in the imaging system 100 of FIG. 1, the field of view 210 of FIG. 2 is wider than the field of view 110 of FIG. 1. As such, the use of curved screens may be beneficial over the use of flat screens since a viewer will be able to view a hologram generated by an imaging system using curved screens at a wider angle as compared to a hologram generated by an imaging system using flat screens.

Figure 3:
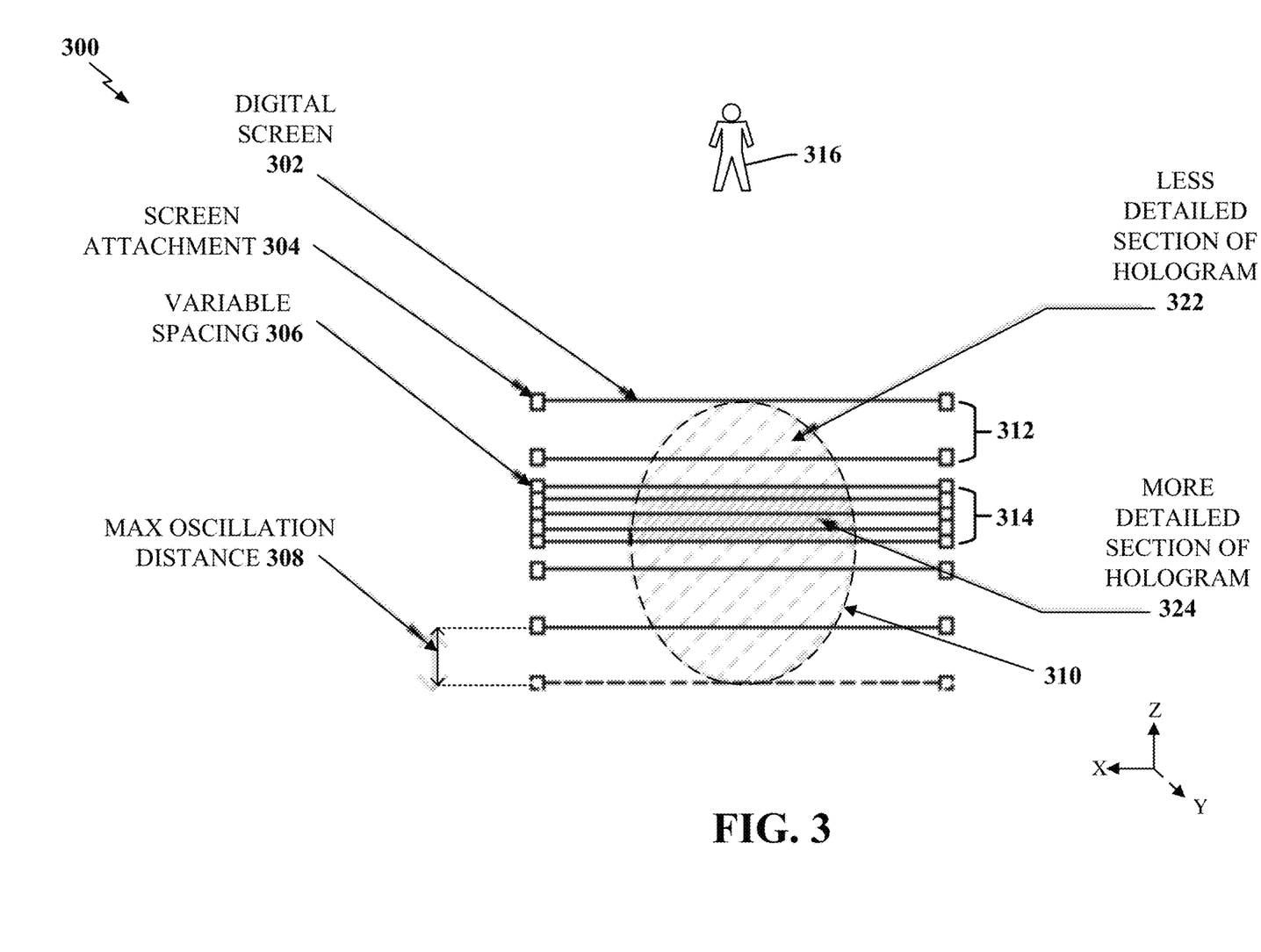
FIG. 3 illustrates an example holographic imaging system utilizing differently spaced digital screens according to an aspect of the present disclosure.

FIG. 3 illustrates an example holographic imaging system 300 utilizing differently spaced digital screens according to an aspect of the present disclosure. The imaging system 300 includes a plurality of digital screens 302 (e.g., flat digital screens and/or curved digital screens). It is noted that the imaging system 300 operates in a manner similar to the imaging system 100 except that the screens may be spaced apart by different distances. As shown, a total of 10 digital screens 302 are included in the imaging system 300, however, it is contemplated that any number forming a plurality of digital screens may be utilized. The digital screens 302 may be any type of screen or display capable of displaying a digital image, such as a liquid crystal display (LCD), a light emitting diode (LED) display, and/or an organic light emitting diode (OLED) display. Other types of digital screens implementing other types of technologies may also be utilized. In an aspect, the digital screens 302 may be transparent digital screens.

One or more screen attachments 304 are coupled to outer edges of a digital screen 302. A digital screen is positioned within the imaging system 300 with respect to an adjacent (or neighboring) digital screen via, a screen attachment 304. The screen attachment coupled to a digital screen may connect to a frame or structure of the imaging system 300 and/or connect to a screen attachment of another digital screen. In an aspect, each digital screen 302 is positioned parallel to an x-axis and a y-axis of the imaging system 300.

Moreover, the digital screens 302 are stacked along a z-axis perpendicular to the x-axis and the y-axis. In an aspect, the z-axis may be parallel to a plane on which a viewer 316 is standing (horizontal plane view). Alternatively, the z-axis may be perpendicular to the plane on which the viewer 316 is standing (e.g., tabletop view).

The imaging system 300 also includes a propulsion system configured to oscillate move back and forth) the plurality of digital screens 302 along the z-axis. The propulsion system included in the imaging system 300 may be similar to the propulsion system (including the one or more pistons 112 and the motor 114) described with respect to FIG. 1. Therefore, discussion of the propulsion system with respect to the imaging system 300 of FIG. 3 will be omitted for brevity.

The imaging system 300 further includes a control system (e.g., control system 614 of FIG. 6) for managing operation of the imaging system 300. The control system is configured to generate a digital image and instruct one or more digital screens of the plurality of digital screens 302 to display different slices of the digital image. The control system may generate an image, digitally divide the image into different portions (slices), and cause the display of each portion on a corresponding screen. For example, the control system may divide the generated image into any number of portions up to a maximum number of digital screens included in the imaging system 300 and cause the display of the portions on corresponding digital screens. In an aspect, the control system may divide the generated image into a number of portions that is fewer than the maximum number of digital screens. Accordingly, the control system may utilize fewer than the maximum number of digital screens to display the image portions.

The control system is further configured to send a signal to activate the propulsion system to oscillate the plurality of digital screens 302 in synchronization with the display of the different slices on the one or more digital screens to generate a three-dimensional (3D) image, such as a hologram 310. For example, the plurality of digital screens 302 are oscillated at a particular frequency in the direction (e.g., along the z-axis) of a viewer's (viewer 316) field of view. As the screens 302 are rapidly moved back and forth within a maximum oscillation distance 308 while displaying the image portions (slices), the viewer 316 can see the light emanating from the screens 302 at different depths and a dynamic 3D image (moving, hologram) appears to the viewer's eyes due to the viewer's persistence of vision.

In an aspect, the plurality of digital screens may be spaced apart different distances from each other to provide certain areas of the image with greater or less detail while oscillating the screens at the same frequency. For example, if a particular section of the image is to be provided with greater detail, then the digital screens corresponding to the particular section of the image may be positioned closer together (with less spacing between screens, e.g., 5 mm to 15 mm spacing). If another section of the image is to be provided with less detail, then the digital screens corresponding to the other section may be positioned farther apart (with more spacing between screens, e.g., 25 mm to 50 mm spacing).

As shown in FIG. 3, a first set of digital screens 312 of the plurality of digital screens are separated from each other by a first distance (e.g., more spacing between screens). Accordingly, a less detailed section 322 of the hologram 310 may be displayed via the first set of digital screens 312. Also, a maximum distance the plurality of digital screens are oscillated (maximum oscillation distance 308) may be equal to the first distance. As further shown in FIG. 3, at least one other set of digital screens 314 of the plurality of digital screens may have variable spacing 306 with respect to the first set of digital screens 312. For example, the at least one other set of digital screens may be separated from each other by a second distance less than the first distance (e.g., less spacing between screens). Accordingly, a more detailed section 324 of the hologram 310 may be displayed via the at least one other set of digital screens 314. In an aspect, the at least one other set of digital screens 314 are separated from each other by a distance less than the maximum oscillation distance 308. By doing so, a refresh rate of a perceived 3D image (hologram 310) in the more detailed section 324 is increased. Accordingly, the detail of any animation in the section 324 of the hologram 310 is increased, e.g., any animation in the section 324 of the hologram 310 appears to have a smoother movement.

Figure 4:
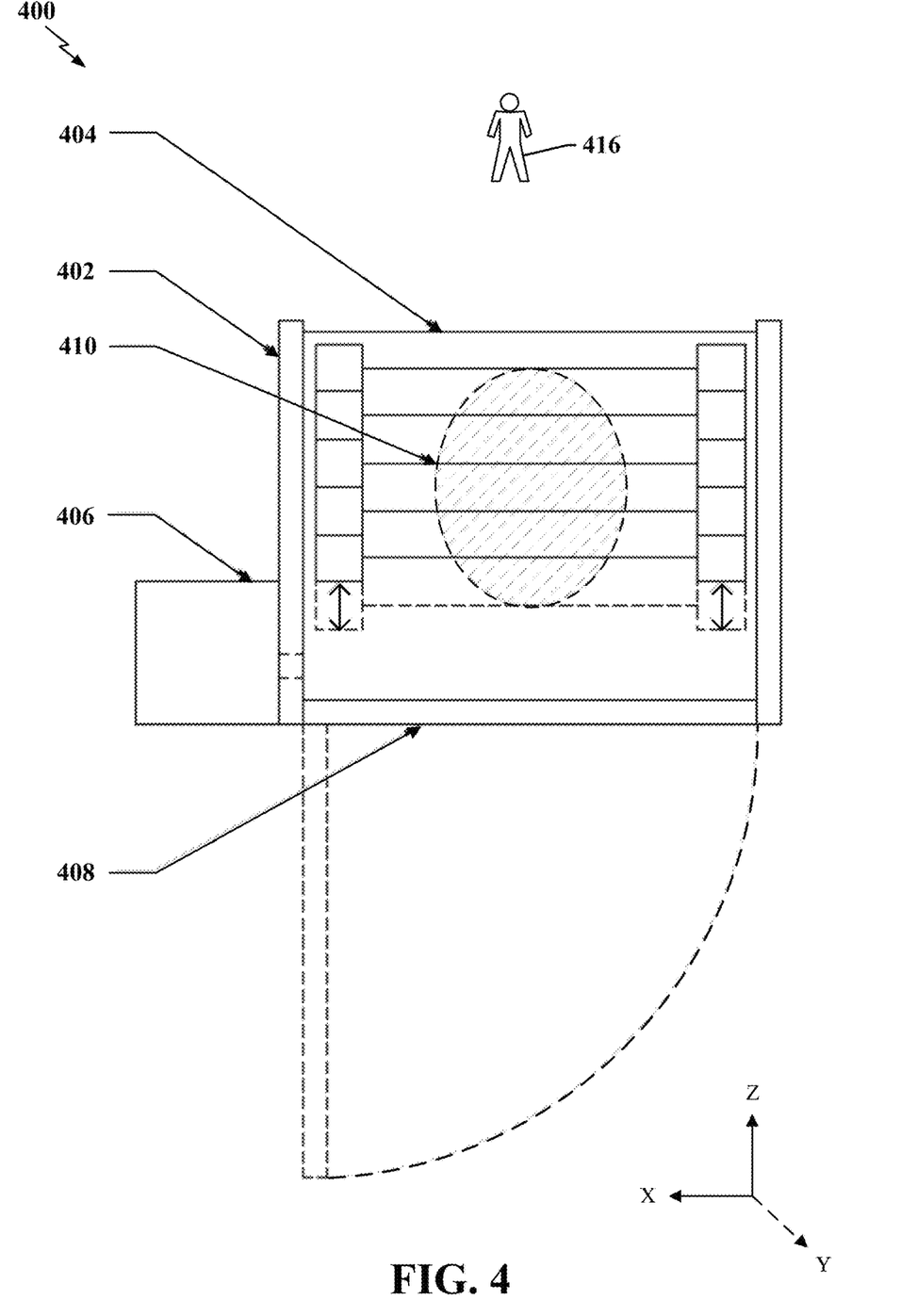
FIG. 4 illustrates a vacuum-scaled chamber for housing a holographic imaging system according to an aspect of the present disclosure.

FIG. 4 illustrates a vacuum-sealed chamber 400 for housing a holographic imaging system according to an aspect of the present disclosure. The holographic imaging system housed within the vacuum-sealed chamber 400 may be any one of the imaging systems described above with respect to FIGS. 1-3, Accordingly, each digital screen of a plurality of digital screens 410 is positioned parallel to an x-axis and a y-axis of the chamber 400. Moreover, the digital screens 410 are stacked along a z-axis perpendicular to the x-axis and the y-axis. In an aspect, the z-axis may be parallel to a plane on which a viewer 416 is standing (horizontal plane view). Alternatively, the z-axis may be perpendicular to the plane on which the viewer 416 is standing (e.g., tabletop view).

In an aspect, the vacuum-sealed chamber 400 may also house a propulsion system for oscillating the plurality of digital screens 410. The propulsion system may be the propulsion system described above with respect to FIG. 1 or the propulsion system to be described below with respect to FIG. 5.

In an aspect, the vacuum-sealed chamber 400 may include a vacuum-sealed enclosure 402, a transparent (e.g., clear glass) front window 404, a vacuum pump 406, and a resealable access door 408. The transparent front window 404 allows for the viewer 416 to view (e.g., along the z-axis) a 3D image (hologram) generated by the imaging system. In an aspect, the transparent front window 404 may be a curved window (e.g., to accommodate a curved digital screen of the holographic imaging system). In an aspect, the transparent front window 404 may take the form of a transparent box (e.g., to accommodate a curved digital screen of the holographic imaging system that extends beyond supporting frames). The resealable access door 408 allows for the chamber 400 to be conveniently opened and closed for maintenance.

The vacuum-sealed enclosure 402 is configured to prevent air (or other gases) external to the chamber 400 from entering into the chamber 400 and coming into contact with the imaging system housed within. The vacuum pump 406 is configured to extract air (or other gases) out of the chamber 400. By isolating the imaging system in an air-free environment via the chamber 400 wind resistance and deformation of the digital screens 410 may be reduced when the screens are oscillated. Accordingly, a higher quality 3D image may be generated due to less screen deformations and a lifetime of the imaging system may be extended as less wear and tear is experienced by the screens.

Figure 5:
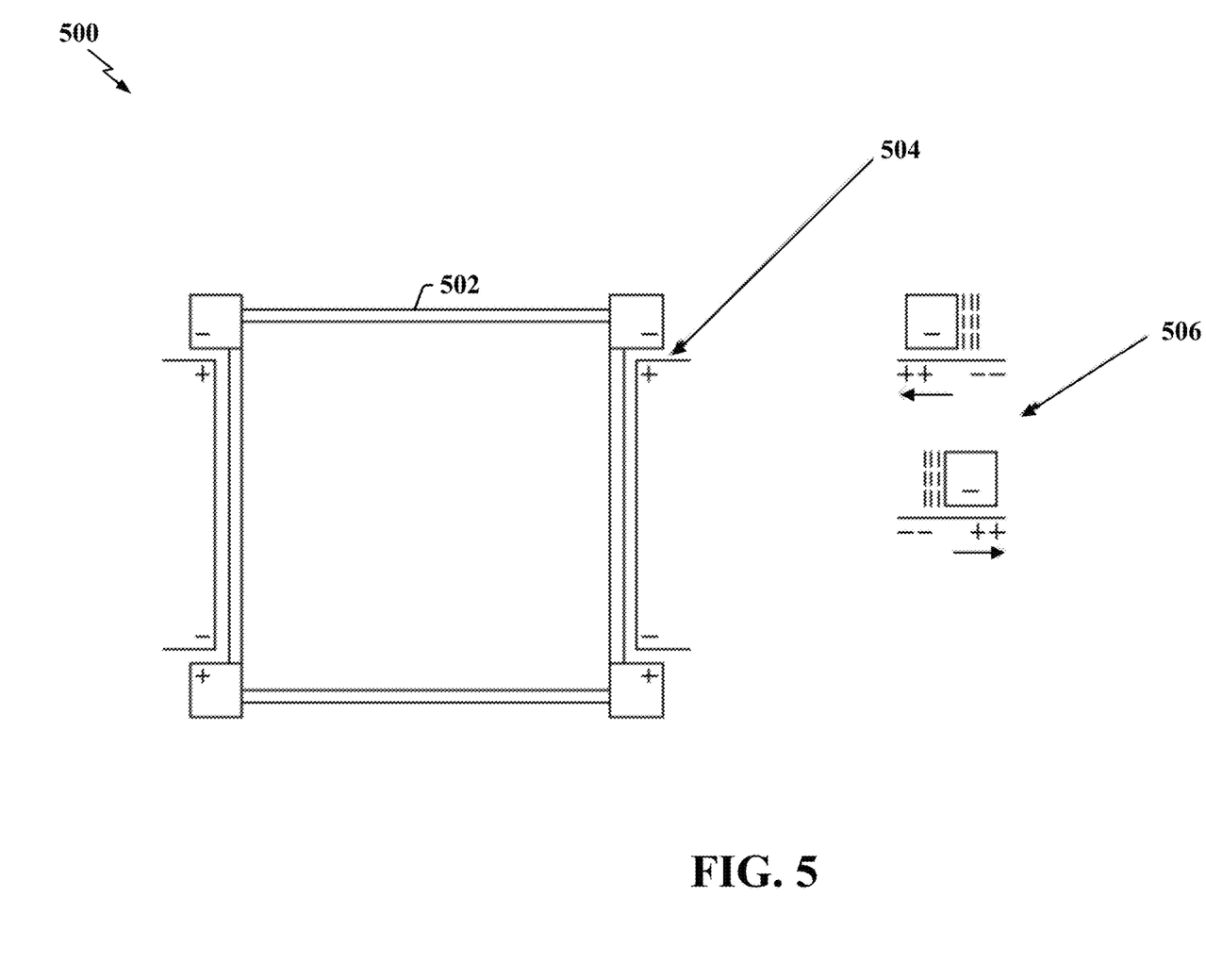
FIG. 5 illustrates a propulsion system utilizing electromagnetic propulsion according to an aspect of the present disclosure.

FIG. 5 illustrates a propulsion system 500 utilizing electromagnetic propulsion according to an aspect of the present disclosure. The propulsion system 500 may be implemented to oscillate a plurality of digital screens of any one of the imaging systems described above with respect to FIGS. 1-4, Accordingly, in an aspect, the propulsion system 500 may replace the above-described propulsion system utilizing a piston (e.g., one or more pistons 112) and a motor (e.g., motor 114).

Referring to FIG. 5, a plurality of digital screens 502 may be suspended via magnetic forces (a magnetic field 506) on an electromagnetic track 504, Accordingly, a control system of the imaging system may vary a polarity of the magnetic field 506 (e.g., change the polarity back and forth) to oscillate the plurality of digital screens 502 (e.g., along a z-axis).

Notably, by suspending the digital screens 502 on the electromagnetic track 504 and moving the digital screens magnetically by changing the polarity of an electrically charged perimeter, each screen moves with reduced friction. As such, the propulsion system utilizing the electromagnetic track may oscillate the plurality of digital screens at a frequency faster than a propulsion system utilizing a piston and motor.

Figure 6:
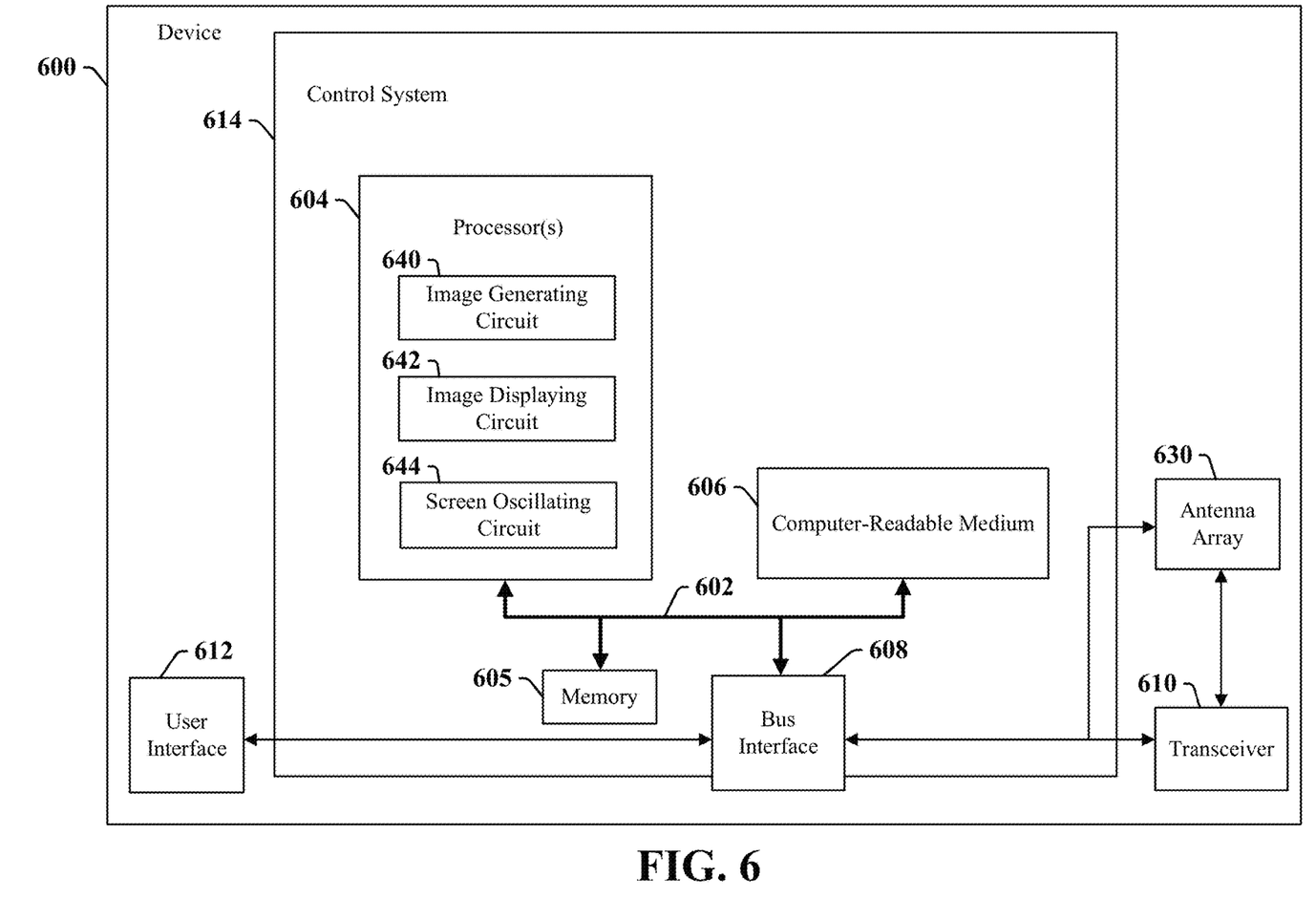
FIG. 6 is a block diagram illustrating an example of a hardware implementation for an exemplary device employing a control system in accordance with aspects of the present disclosure.

FIG. 6 is a block diagram illustrating an example of a hardware implementation for an exemplary device 600 employing a control system 614. For example, the device 600 may be a computer, workstation, laptop, tablet, mobile phone, or any other type of electronic device capable of communicating with and/or controlling other electronic devices. Moreover, the control system 614 may be the control system controlling the holographic imaging systems shown in FIGS. 1-5. The control system 614 includes one or more processors 604, Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the device 600 may be configured to perform any one or more of the functions described herein. That is, the processor 604, as utilized in a device 600, may be used to implement any one or more of the processes and procedures described and illustrated in FIG. 7.

In this example, the control system 614 may be implemented with a bus architecture, represented generally by a bus 602. The bus 602 may include any number of interconnecting buses and bridges depending on the specific application of the processing system 614 and the overall design constraints. The bus 602 communicatively couples together various circuits including one or more processors (represented generally by the processor 604), a memory 605, and computer-readable media (represented generally by the computer-readable medium 606). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a communication interface or means for communicating with various other apparatus over a transmission medium (e.g., via a wired connection or a wireless connection using an antenna array 630), For example, the transceiver 610 may provide a communication interface between the control system 614, the plurality of digital screens, and the propulsion system of the holographic imaging system described herein. Depending upon the nature of the device, a user interface 612 (e.g., keypad, display, speaker, microphone, joystick) may also be provided. Of course, such a user interface 612 is optional, and may be omitted in some examples.

In some aspects of the disclosure, the processor 604 may include image generating circuitry 640 configured for various functions, including, for example, generating a digital image. For example, the image generating circuitry 640 may be configured to implement one or more of the functions described below in relation to FIG. 7, including, block 702. The processor 604 may also include image displaying circuitry 642 configured for various functions, including, for example, instructing one or more digital screens of a plurality of digital screens to display different slices of the digital image, wherein each screen of the plurality of digital screens is positioned parallel to an x-axis and a y-axis, and the plurality of digital screens are stacked along a z-axis perpendicular to the x-axis and the y-axis. For example, the image displaying circuitry 642 may be configured to implement one or more of the functions described below in relation to FIG. 7, including, e.g., block 704. The processor 604 may also include screen oscillating circuitry 644 configured for various functions, including, for example, activating a propulsion system to oscillate the plurality of digital screens along the z-axis in synchronization with the display of the different slices on the one or more digital screens to generate a three-dimensional (3D) image. For example, the screen oscillating circuitry 644 may be configured to implement one or more of the functions described below in relation to FIG. 7, including, e.g., block 706.

The processor 604 is responsible for managing the bus 602 and general processing, including the execution of software stored on the computer-readable medium 606. The software, when executed by the processor 604, causes the control system 614 to perform the various functions described below for any particular apparatus. The computer-readable medium 606 and the memory 605 may also be used for storing data that is manipulated by the processor 604 when executing software.

One or more processors 604 in the control system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606. The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 606 may reside in the control system 614, external to the control system 614, or distributed across multiple entities including the control system 614. The computer-readable medium 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 7:
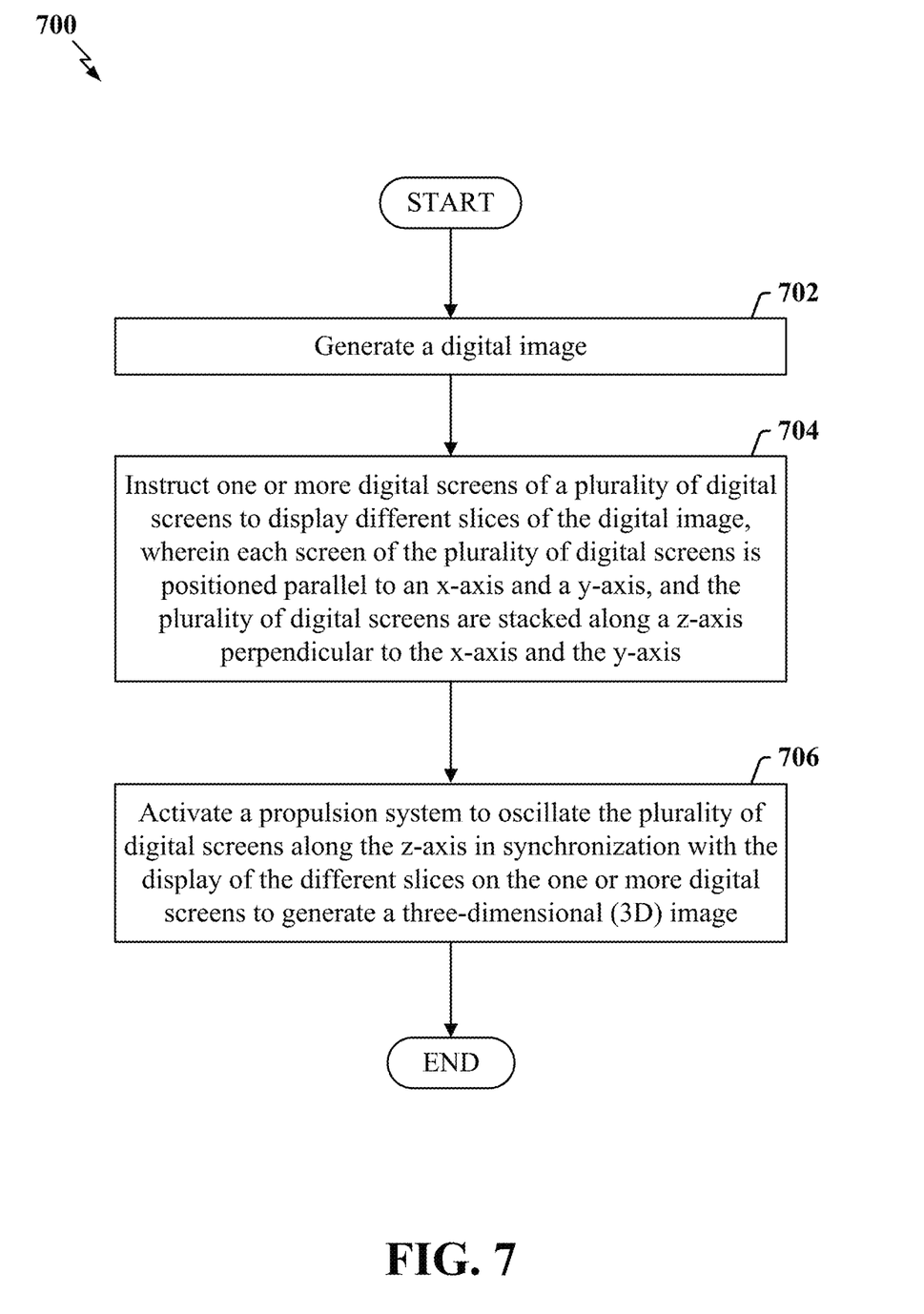
FIG. 7 is a flow chart illustrating an exemplary process for generating a holographic image in accordance with aspects of the present disclosure.

FIG. 7 is a flow chart illustrating an exemplary process 700 for generating a holographic image in accordance with aspects of the present disclosure. As described below, some or all illustrated features may be omitted in a particular implementation within the scope of the present disclosure, and some illustrated features may not be required for implementation of all aspects. In some examples, the process 700 may be carried out by the control system 604 of the device 600 illustrated in FIG. 6, which may be a computer, workstation, laptop, tablet, mobile phone, or any other type of electronic device capable of communicating with and/or controlling other electronic devices. In some examples, the process 700 may be carried out by any suitable apparatus or means for carrying out the functions or algorithm described below.

At block 702, the control system may generate a digital image (e.g., by accessing a picture or video from the memory 605).

At block 704, the control system may instruct one or more digital screens of a plurality of digital screens to display different slices of the digital image. Each screen of the plurality of digital screens is positioned parallel to an x-axis and a y-axis, and the plurality of digital screens are stacked along a z-axis perpendicular to the x-axis and the y-axis. Moreover, the plurality of digital screens may include a liquid crystal display (LCD), a light emitting diode (LED) display, and/or an organic light emitting diode (OLED) display. However, it is contemplated that other types of digital screens implementing other types of technologies may also be included.

In an aspect, the plurality of digital screens are transparent digital screens. In an aspect, the plurality of digital screens are flat digital screens (see FIG. 1). In an aspect, the plurality of digital screens are curved digital screens (see FIG. 2).

At block 704, the control system may activate (e.g., via sending a signal) a propulsion system to oscillate the plurality of digital screens along the z-axis in synchronization with the display of the different slices on the one or more digital screens to generate a three-dimensional (3D) image.

In an aspect, the propulsion system includes one or more pistons (e.g., piston 112) coupled to an outer edge of the plurality of digital screens. The propulsion system may further include a motor (e.g., motor 114) configured to actuate the one or more pistons to oscillate the plurality of digital screens along the z-axis based on an activation signal from the control system.

In an aspect, the propulsion system includes an electromagnetic track in which the plurality of digital screens are suspended by a magnetic field (see FIG. 5) Accordingly, the control system may be configured to vary a polarity of the magnetic field to oscillate the plurality of digital screens along the z-axis.

In an aspect, the plurality of digital screens are separated from each other by a fixed distance. Accordingly, a maximum distance the plurality of digital screens are oscillated is equal to the fixed distance.

In an aspect, a first set of digital screens of the plurality of digital screens are separated from each other by a first distance, and at least one other set of digital screens of the plurality of digital screens are separated from each other by a second distance less than the first distance (see FIG. 3). Accordingly, a maximum distance the plurality of digital screens are oscillated is equal to the first distance.

In an aspect, the plurality of digital screens and the propulsion system may be housed in a vacuum-sealed chamber (e.g., vacuum-sealed chamber 404). As such, wind resistance and deformation of the digital screens may be reduced when the screens are oscillated.

Figure 8:
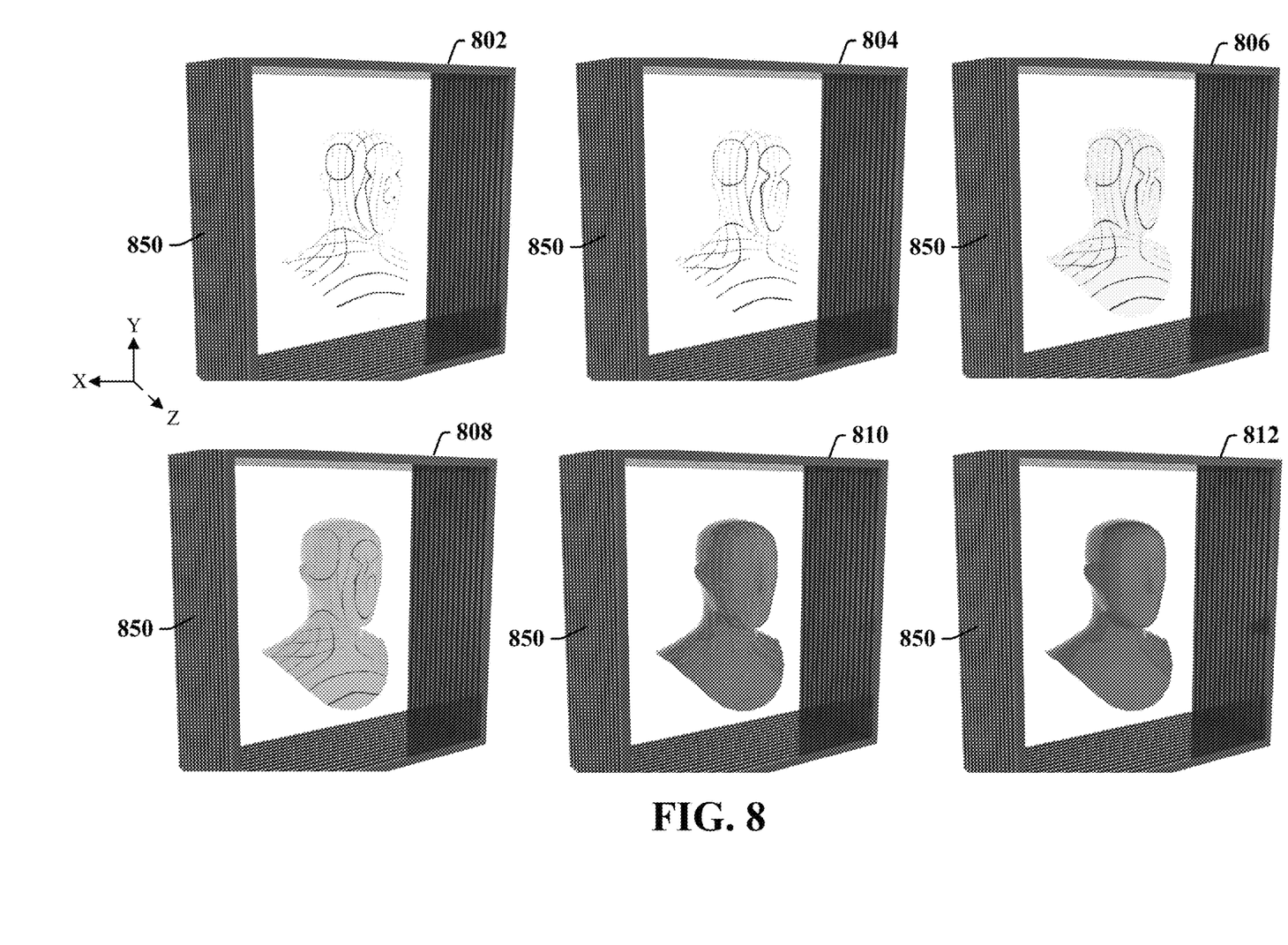
FIG. 8 illustrates examples of three-dimensional (3D) images generated via a holographic imaging system in accordance with aspects of the present disclosure.

FIG. 8 illustrates examples of three-dimensional (3D) images generated via a holographic imaging system in accordance with aspects of the present disclosure. In FIG. 8, a plurality of digital screens 850 of a holographic imaging system are shown. Although not shown, the holographic imaging system may also include a control system and a propulsion system similar to the systems described above. The digital screens 850 may be any type of screen or display capable of displaying a digital image, such as a liquid crystal display (LCD), a light emitting diode (LED) display, and/or an organic light emitting diode (OLED) display. Other types of digital screens implementing other types of technologies may also be utilized. In an aspect, the digital screens 850 are transparent digital screens (e.g., to facilitate the generation of light-colored holograms, dark-colored holograms, and holograms having colors therebetween). In an aspect, the digital screens 850 are positioned parallel to an x-axis and a y-axis. Moreover, the digital screens 850 are stacked along a z-axis perpendicular to the x-axis and the y-axis.

In an aspect, a control system of the holographic imaging system may activate the propulsion system to oscillate the plurality of digital screens 850 along a viewer's field of view (e.g., z-axis) in synchronization with the display of different image slices on one or more digital screens to generate a three-dimensional (3D) image, such as holograms 802, 804, 806, 808, 810, and 812. As the screens 850 are rapidly moved back and forth while displaying the image slices, light emanating from the screens 850 can be seen at different depths and a dynamic 3D image (moving hologram) appears (due to a viewer's persistence of vision).

As shown via holograms 802, 804, 806, 808, 810, and 812, the control system may coordinate between the screens 850 to create holograms depicting a human head. That is, the control system may correctly sequence what is displayed on each of the screens 850 such that the image slices displayed on the respective screens synchronize with each other to form a dynamic hologram of the human head. A first hologram 802 depicts what a viewer sees if the digital screens 850 were stopped and not oscillating. Each "line" in the overall image is a particular image slice that is shown on a corresponding screen. The image slices are slightly different in the first hologram 802, second hologram 804, and a third hologram 806 as they show how an image slice displayed on each screen changes as the screen moves relative to the position of the hologram. A fourth hologram 808, a fifth hologram 810, and a sixth hologram 812 illustrate the fading in of the human head and the fading out of the "lines". This shows that as the screen oscillation is increased beyond the perception of human eyes, persistence of vision takes over and the viewer sees the hologram of the human head.

Within the present disclosure, the word "exemplary" is used to mean "serving as an example, instance, or illustration," Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another even if they do not directly physically touch each other. For instance, a first object may be coupled to a second object even though the first object is never directly physically in contact with the second object.

One or more of the components, steps, features and/or functions illustrated in FIGS. 1-8 may be rearranged and/or combined into a single component, step, feature or function or embodied in several components, steps, or functions, Additional elements, components, steps, and/or functions may also be added without departing from novel features disclosed herein. The apparatus, devices, and/or components illustrated in FIGS. 1-8 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A holographic imaging system, the system comprising:
a plurality of transparent digital screens, wherein each screen of the plurality of transparent digital screens is positioned parallel to an x-axis and a y-axis, and the screens are stacked along a z-axis perpendicular to the x-axis and the y-axis;
a propulsion system configured to oscillate the plurality of transparent digital screens along the z-axis; and
a control system configured to:
generate a digital image,
instruct the plurality of transparent digital screens to display different image slices of the digital image,
send a signal to activate the propulsion system to oscillate the plurality of transparent digital screens in synchronization with the display of the different image slices on the plurality of transparent digital screens to generate a three-dimensional (3D) image, and
change at least one image slice displayed on at least one transparent digital screen of the plurality of transparent digital screens while the at least one transparent digital screen is oscillating.

2. The system of claim 1, wherein the plurality of transparent digital screens are separated from each other by a fixed distance.

3. The system of claim 2, wherein a maximum distance the plurality of transparent digital screens are oscillated is equal to the fixed distance.

4. The system of claim 1, wherein:
a first set of digital screens of the plurality of transparent digital screens are separated from each other by a first distance; and
at least one other set of digital screens of the plurality of transparent digital screens are separated from each other by a second distance less than the first distance.

5. The system of claim 4, wherein a maximum distance the plurality of transparent digital screens are oscillated is equal to the first distance.

6. The system of claim 1, wherein the plurality of transparent digital screens comprises at least one of:
a liquid crystal display (LCD);
a light emitting diode (LED) display; or
an organic light emitting diode (OLED) display.

7. The system of claim 1, wherein the plurality of transparent digital screens comprise:
flat digital screens; or
curved digital screens.

8. The system of claim 1, further comprising:
a vacuum-sealed chamber configured to house the plurality of transparent digital screens and the propulsion system.

9. The system of claim 1, wherein the propulsion system comprises:
at least one piston coupled to an outer edge of the plurality of transparent digital screens; and
a motor configured to actuate the at least one piston to oscillate the plurality of transparent digital screens along the z-axis based on the signal from the control system.

10. The system of claim 1, wherein the propulsion system comprises:
an electromagnetic track in which the plurality of transparent digital screens are suspended by a magnetic field, wherein the control system is configured to vary a polarity of the magnetic field to oscillate the plurality of transparent digital screens along the z-axis.

11. A method for generating a holographic image, the method comprising:
generating a digital image via a control system;
instructing, via the control system, a plurality of transparent digital screens to display different image slices of the digital image, wherein each screen of the plurality of transparent digital screens is positioned parallel to an x-axis and a y-axis, and the plurality of transparent digital screens are stacked along a z-axis perpendicular to the x-axis and the y-axis;
activating, via the control system, a propulsion system to oscillate the plurality of transparent digital screens along the z-axis in synchronization with the display of the different image slices on the plurality of transparent digital screens to generate a three-dimensional (3D) image; and changing, via the control system, at least one image slice displayed on at least one transparent digital screen of the plurality of transparent digital screens while the at least one transparent digital screen is oscillating.

12. The method of claim 11, wherein the plurality of transparent digital screens are separated from each other by a fixed distance.

13. The method of claim 12, wherein a maximum distance the plurality of transparent digital screens are oscillated is equal to the fixed distance.

14. The method of claim 11, wherein:
a first set of digital screens of the plurality of transparent digital screens are separated from each other by a first distance; and
at least one other set of digital screens of the plurality of transparent digital screens are separated from each other by a second distance less than the first distance.

15. The method of claim 14, wherein a maximum distance the plurality of transparent digital screens are oscillated is equal to the first distance.

16. The method of claim 11, wherein the plurality of transparent digital screens comprises at least one of:
a liquid crystal display (LCD);
a light emitting diode (LED) display; or
an organic light emitting diode (OLED) display.

17. The method of claim 11, wherein the plurality of transparent digital screens comprise:
flat digital screens; or
curved digital screens.

18. A control system for generating a holographic image, the control system comprising:
a memory; and
at least one processor coupled to the memory, wherein the at least one processor is configured to:
generate a digital image,
instruct a plurality of transparent digital screens to display different image slices of the digital image, wherein each screen of the plurality of transparent digital screens is positioned parallel to an x-axis and a y-axis, and the plurality of transparent digital screens are stacked along a z-axis perpendicular to the x-axis and the y-axis,
activate a propulsion system to oscillate the plurality of transparent digital screens along the z-axis in synchronization with the display of the different image slices on the plurality of transparent digital screens to generate a three-dimensional (3D) image, and
change at least one image slice displayed on at least one transparent digital screen of the plurality of transparent digital screens while the at least one transparent digital screen is oscillating.

* * * * *